(12) United States Patent
Fairchild

(10) Patent No.: US 6,618,255 B2
(45) Date of Patent: Sep. 9, 2003

(54) QUICK RELEASE FASTENING SYSTEM FOR STORAGE DEVICES

(75) Inventor: Robert Fairchild, Cowan Heights, CA (US)

(73) Assignee: Quantum Corporation, Milpitas, CA (US)

( * ) Notice: Subject to any disclaimer, the term of this patent is extended or adjusted under 35 U.S.C. 154(b) by 0 days.

(21) Appl. No.: 10/072,560

(22) Filed: Feb. 5, 2002

(65) Prior Publication Data
US 2003/0147220 A1 Aug. 7, 2003

(51) Int. Cl.$^7$ ................................................ H05K 7/16
(52) U.S. Cl. ...................... 361/726; 312/223.2; 248/581
(58) Field of Search ............................. 361/687, 726, 361/684–686, 724, 725, 727; 248/581, 609, 611, 346.03, 500, 346.04; 312/223.1–223.6, 333

(56) References Cited

U.S. PATENT DOCUMENTS

| | | | | |
|---|---|---|---|---|
| 5,995,365 A | * | 11/1999 | Broder et al. ................ | 361/727 |
| 6,418,011 B2 | * | 7/2002 | Omori ......................... | 361/724 |
| 2002/0044427 A1 | * | 4/2002 | Le et al. ...................... | 361/726 |

OTHER PUBLICATIONS

Pages from ATTO Technology, Inc. Website www.attotech.com downloaded on Aug. 29, 2002 author unknown.
Pages from Medea Corporation Website www.medea.com downloaded on Aug. 29, 2002 author unknown.
Pages from N Stor Technologies Website www.nstor.com downloaded on Aug. 29, 2002 author unknown.
Pages from Raidtec Corporation Website www.raidtec.com downloaded on Aug. 29, 2002 author unknown.
Pages from Chaparral Network Storage Website www.chaparralnet.com downloaded on Aug. 29, 2002 author unknown.

* cited by examiner

Primary Examiner—Darren Schuberg
Assistant Examiner—Hung Van Duong
(74) Attorney, Agent, or Firm—Morrison & Foerster LLP

(57) ABSTRACT

A fastening system (26) for a storage system (10) for fastening a storage device (24) to a housing assembly (52) includes a first fastener unit (450) having a fastener (506), and a release assembly (456). In a latched position (500), the fastener (506) secures the storage device (24) to the housing assembly (52). Alternately, in an unlatched position (502), the fastener (506) allows the storage device (24) to be removed from the housing assembly (52). The release assembly (456) moves the fastener (506) between the latched position (500) and the unlatched position (502).

21 Claims, 9 Drawing Sheets

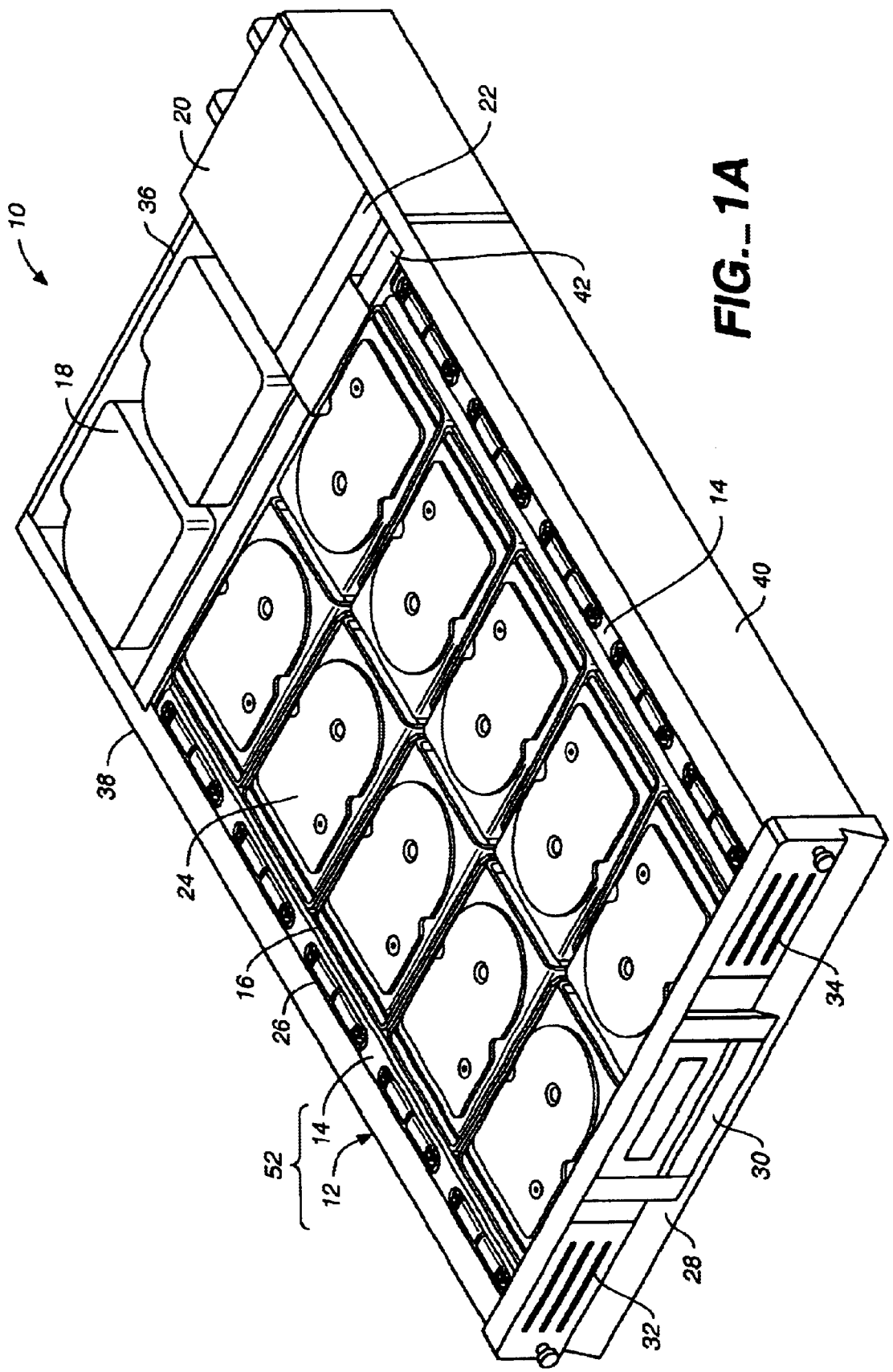
FIG._1A

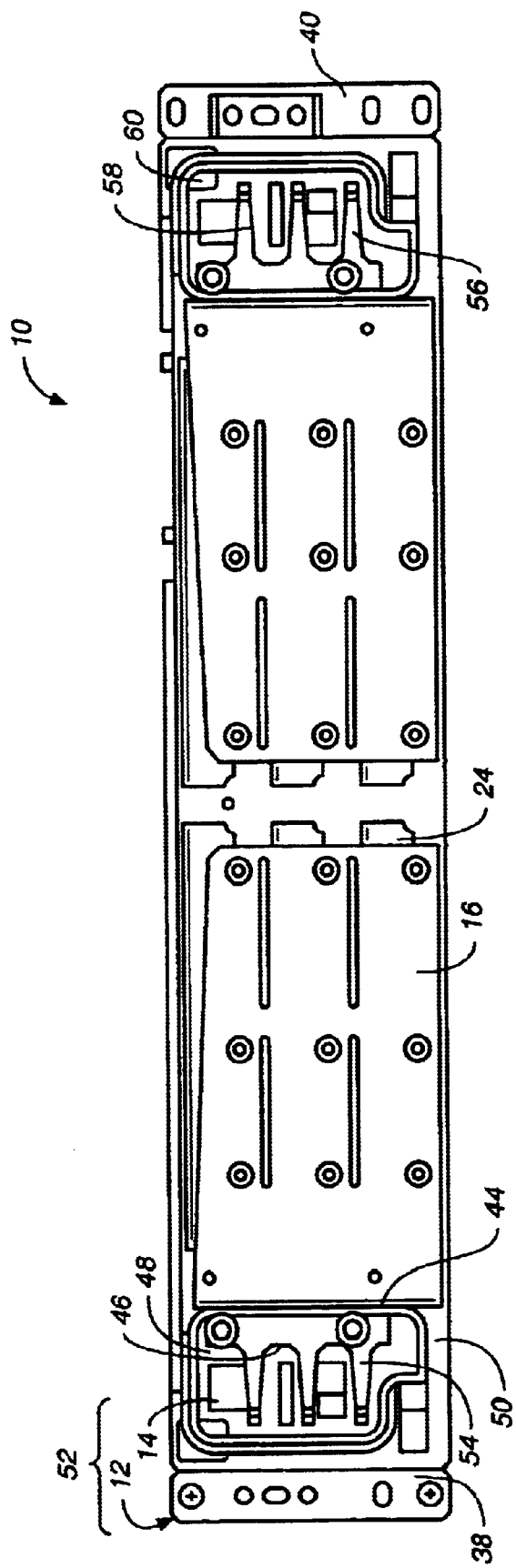
FIG._1B

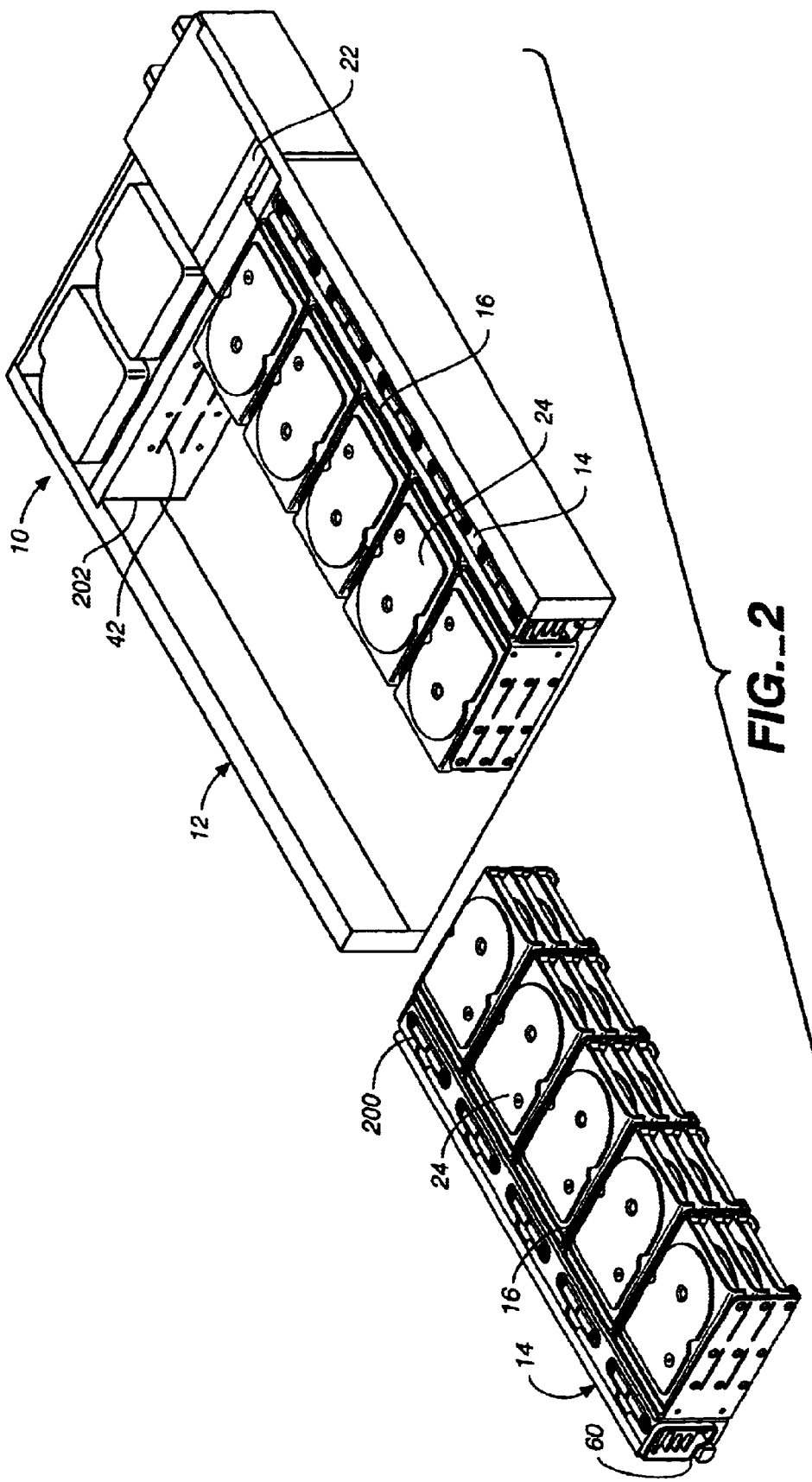
FIG._2

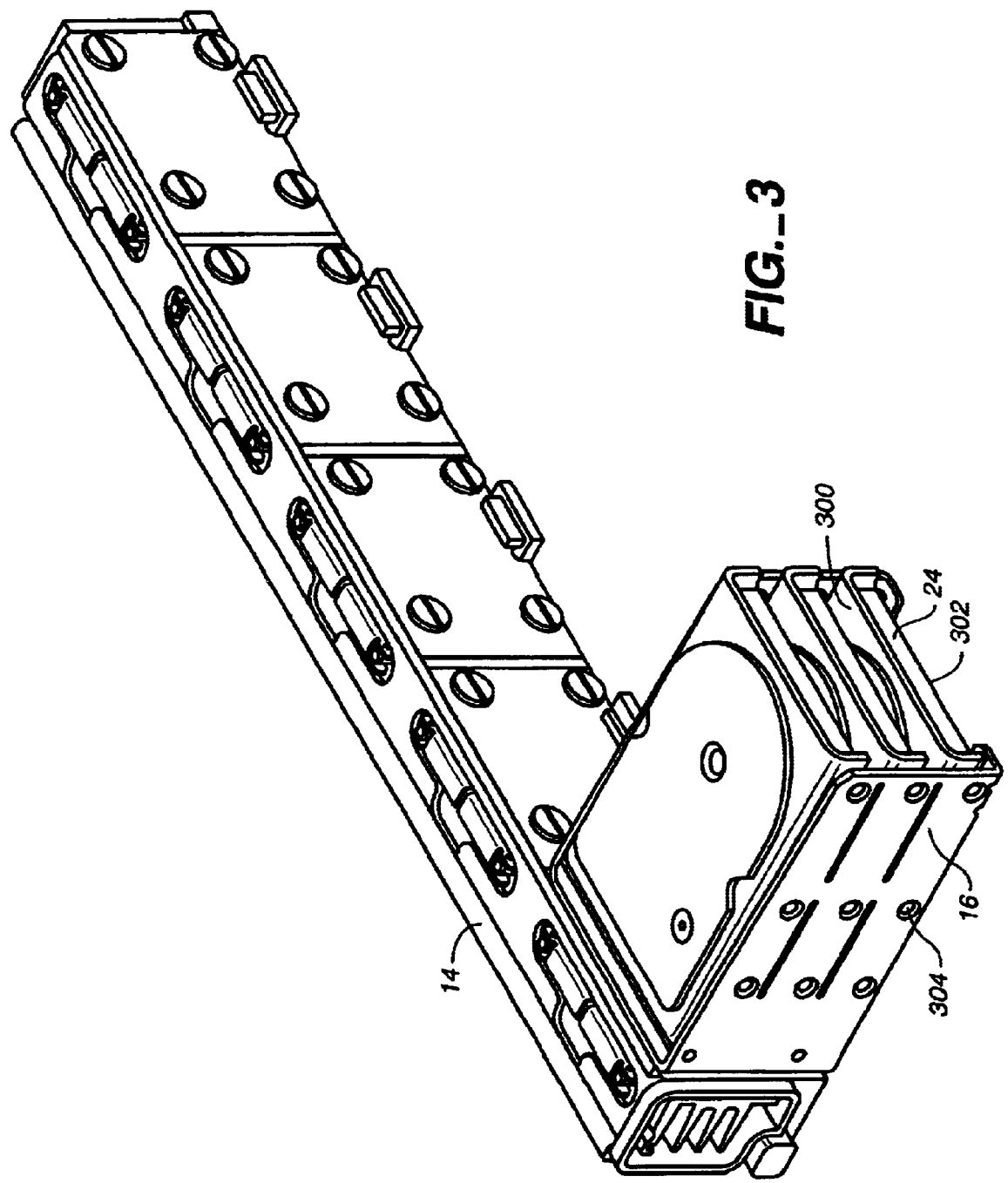

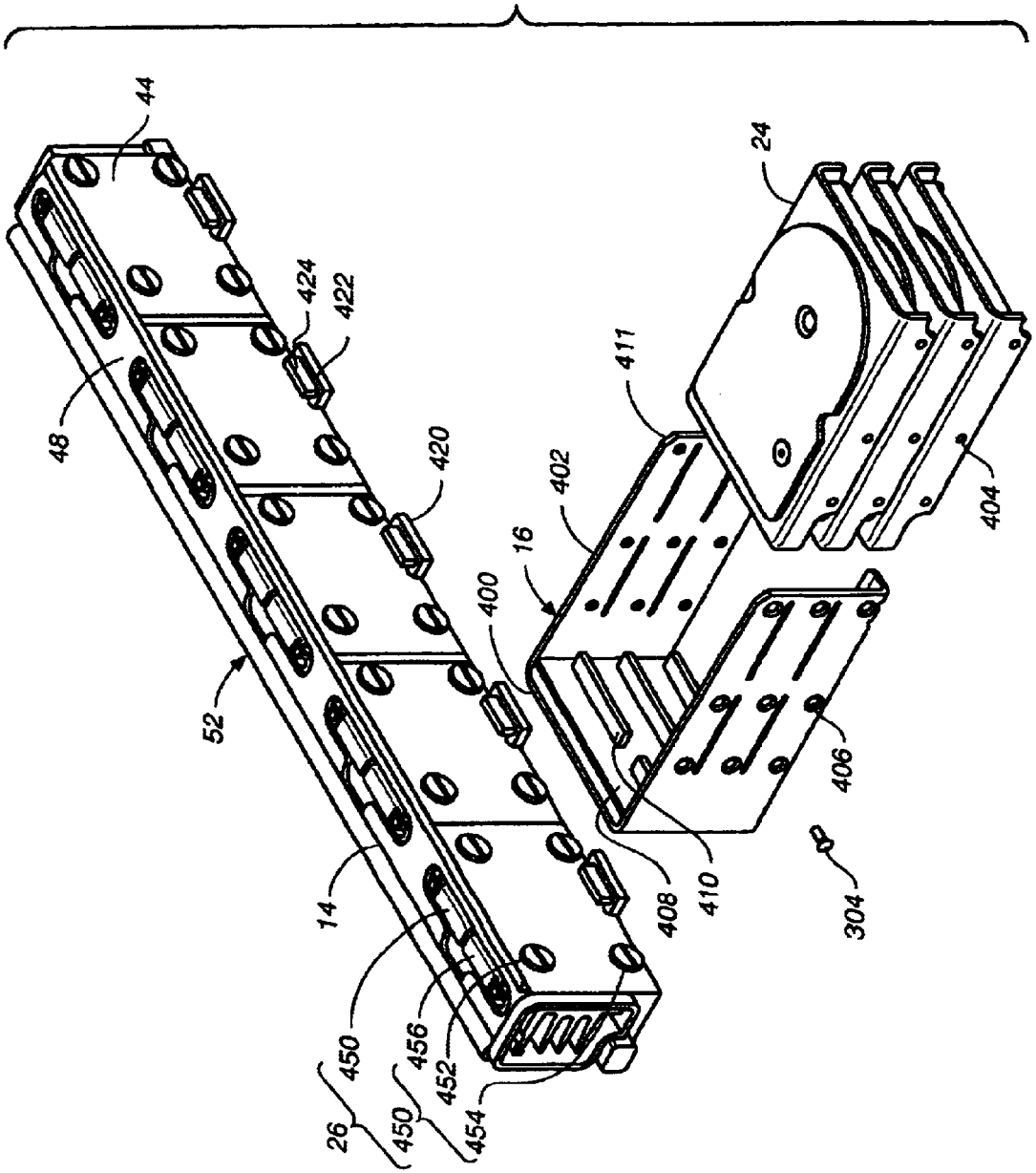
FIG._4

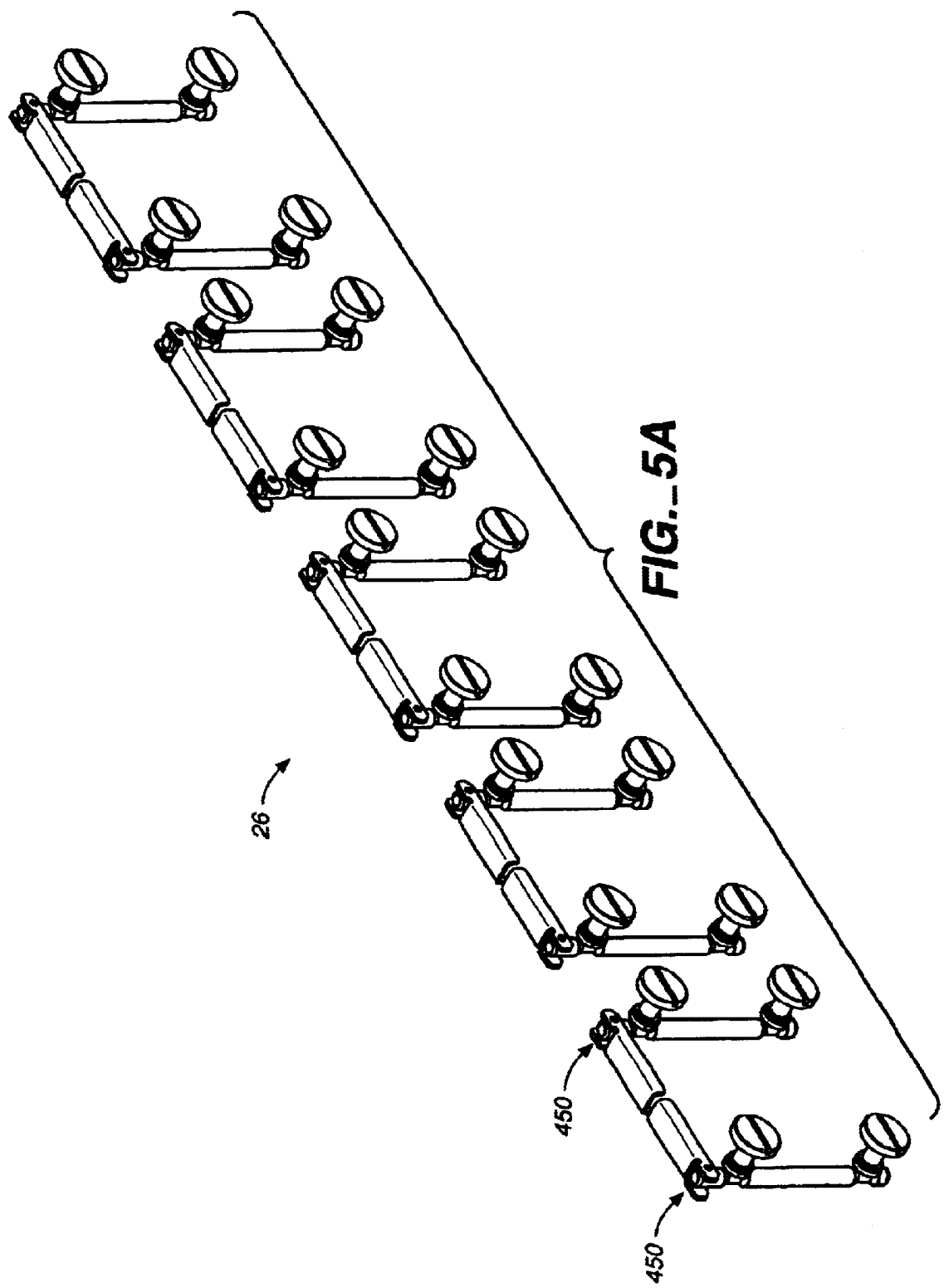
FIG._5A

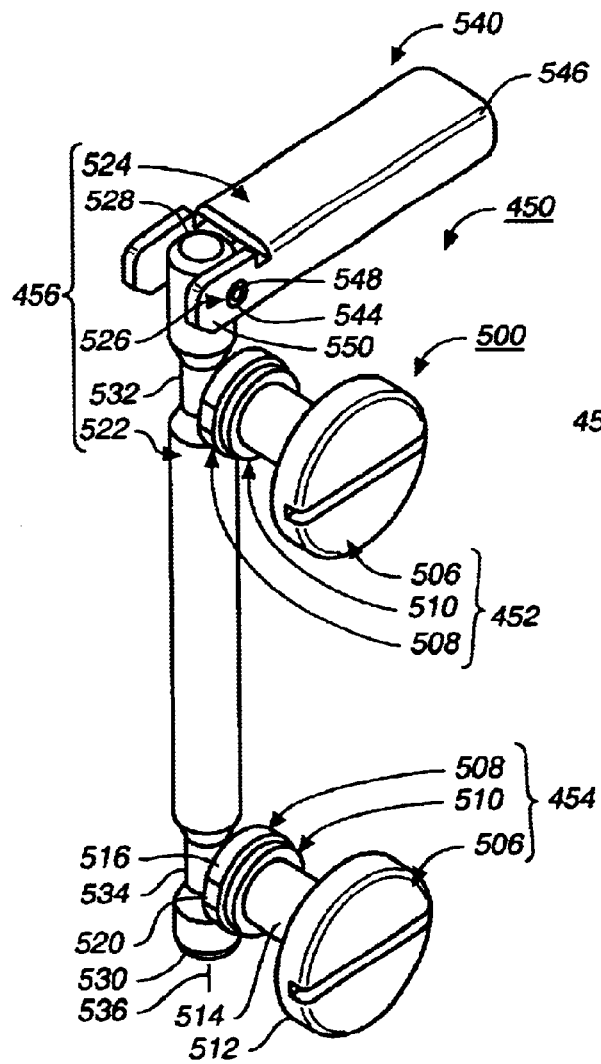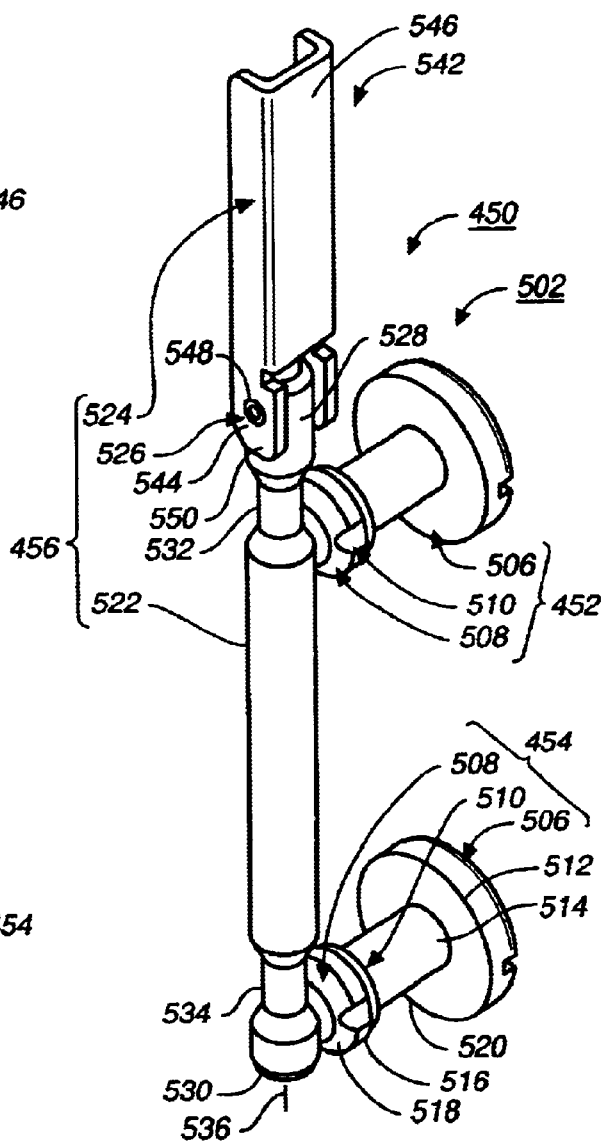
FIG._5B   FIG._5C

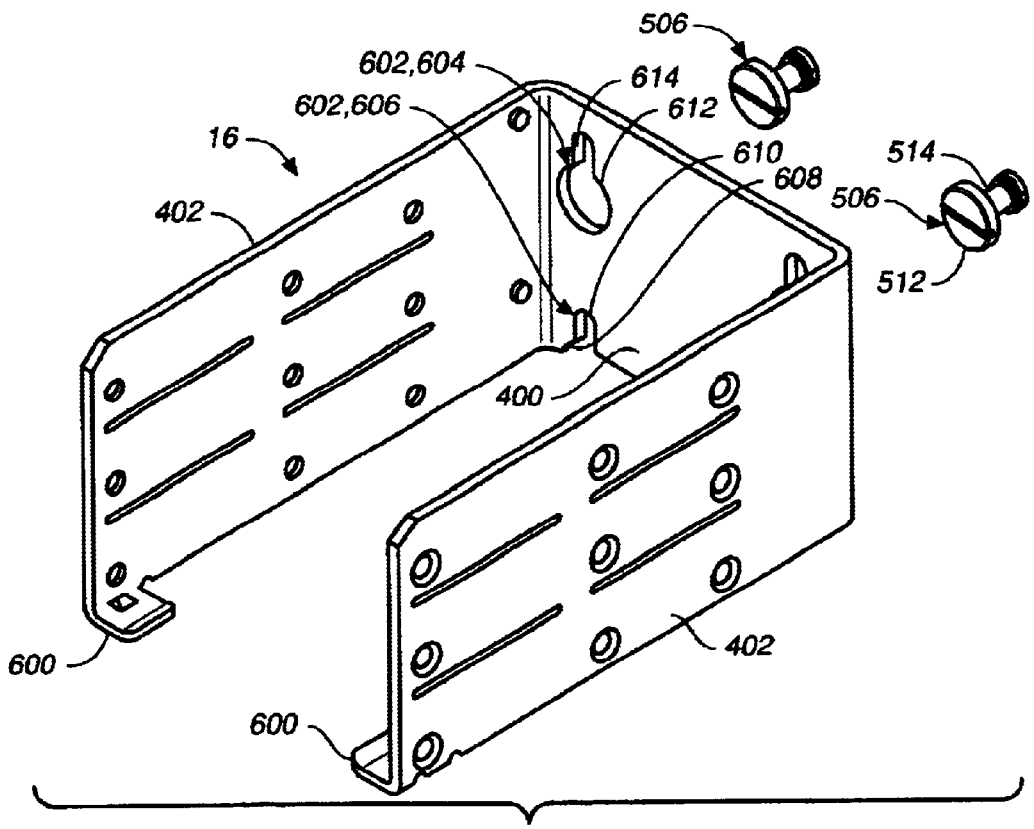
FIG._6A
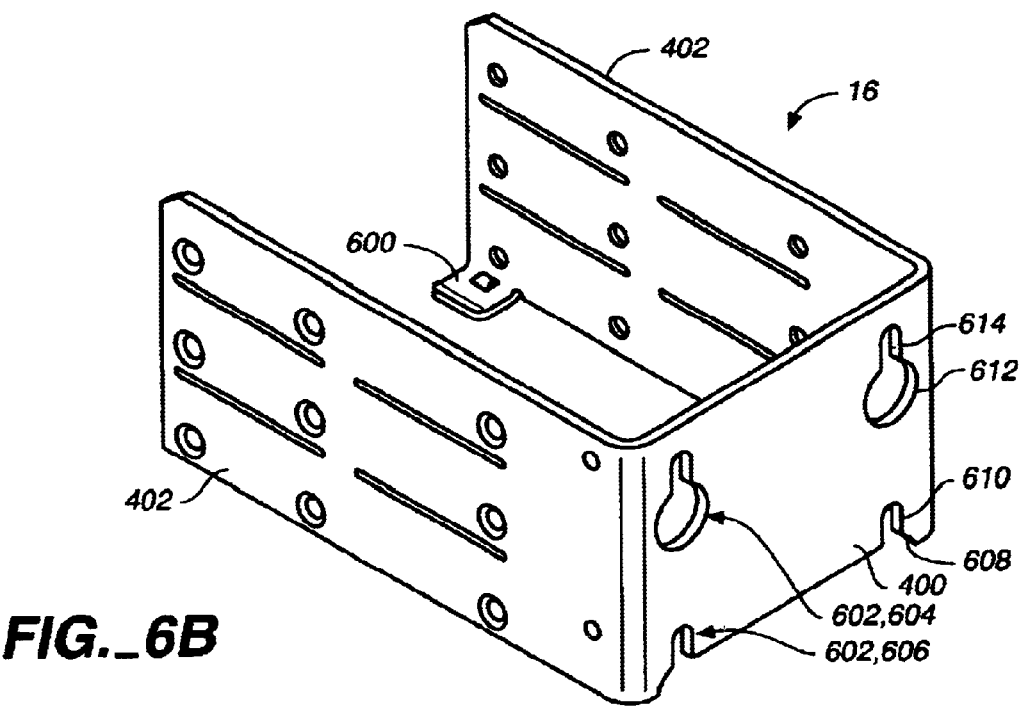
FIG._6B

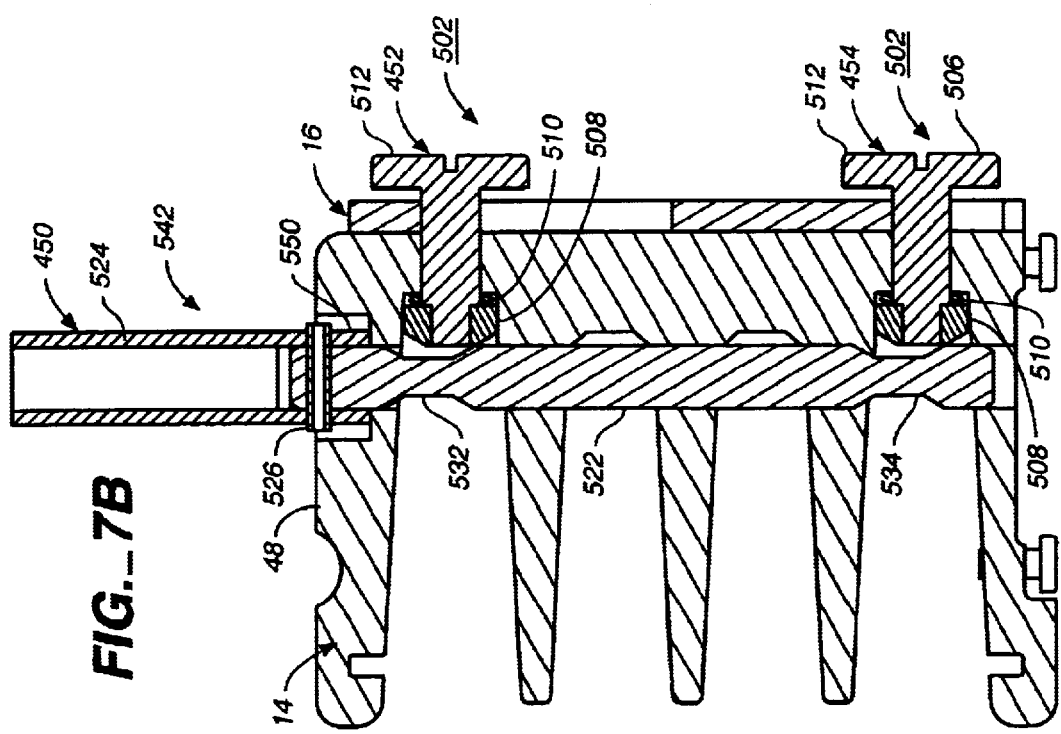
FIG._7A
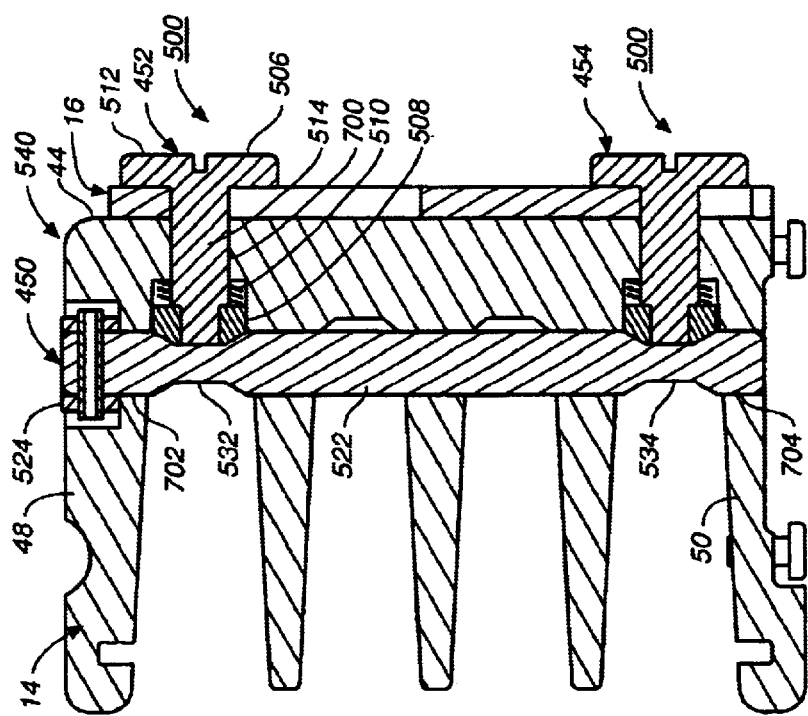
FIG._7B

QUICK RELEASE FASTENING SYSTEM FOR STORAGE DEVICES

FIELD OF THE INVENTION

The present invention relates generally to storage devices for storing data. More specifically, the present invention relates a quick release fastening system to enable high-density packaging of multiple storage devices.

BACKGROUND

Disk drives, or other storage devices, are widely used in computers and data processing systems for storing information in digital form. In conventional disk drives, a transducer "flies" upon an air bearing in very close proximity to a storage surface of a rotating data storage disk. The storage surface carries a thin film of magnetic material having a multiplicity of magnetic storage domains that may be recorded and read back by the transducer.

As computer use continues to increase, there is a corresponding increase in the need to find sufficient storage volume for a greater number of disk drives, or other storage devices. Often a large number of storage devices are packaged together in close proximity to each other in mass storage systems so as to minimize the overall storage volume required. Within these storage systems, a number of storage devices are often stacked one above the other and positioned side by side within a larger enclosure. Typically, threaded fasteners are used to secure the storage systems to a support structure. Occasionally, the individual storage devices will need to be removed from the storage system to be tested, repaired or replaced. Unfortunately, space around the storage systems is needed for tools to install and remove the fasteners. As a result thereof, the storage system must be larger or include fewer storage devices.

In light of the above, there is a need for an easy and reliable way to attach and release storage devices to a structural support while not sacrificing valuable storage volume. Additionally, there is a need to provide a fastening system that allows for high density packaging of storage devices. Further, there is a need to provide a fastening system that is relatively easy and cost effective to manufacture, assemble and use.

SUMMARY

The present invention is directed to a fastening system for a storage system for fastening a storage device to a housing assembly. The fastening system includes a first fastener unit having a fastener, and a release assembly. In a latched position, the fastener secures the storage device to the housing assembly. Alternately, in an unlatched position, the fastener allows the storage device to be removed from the housing assembly. The release assembly moves the fastener between the latched position and the unlatched position.

The fastener includes a shaft portion and a head portion. In one embodiment, the head portion has a cross-section that is greater than a cross-section of the shaft portion. Secured to the fastener are a fastener stop and a resilient member. The fastener stop is secured to an end of the shaft portion away from the head portion. The resilient member substantially surrounds at least a portion of the shaft portion of the fastener. The release assembly includes a release shaft that moves the fastener between the latched position and the unlatched position. The release shaft has a groove positioned adjacent to the fastener stop. The fastener stop has a flat side and a beveled side. The beveled side is positioned to fit into the groove in the release shaft.

The release assembly can also include a release handle coupled to the release shaft. The release handle is movable between a closed position and an open position. As the release handle is moved into the open position, the release shaft is moved upward. As the release shaft moves upward, a wall of the groove contacts the fastener stop. This, in turn, compresses the resilient member and moves the fastener from the latched position to the unlatched position.

A bracket can be used to secure the storage devices to the housing assembly. In one embodiment, the bracket includes an attachment aperture that receives the fastener. When the fastener is in the unlatched position, the bracket can be removed from the fastener. At this time, the bracket and the attached storage device can quickly and easily be removed from the housing assembly. When the release handle is moved back into the closed position, the fastener moves back into the latched position, and the bracket and the attached storage device are once again secured to the housing assembly.

The present invention is also directed to a storage system and a method for fastening at least one storage device within a storage system.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1A is a perspective view of a storage system having features of the present invention;

FIG. 1B is a front plan view of a portion of the storage system;

FIG. 2 is a partially exploded view of a storage system having features of the present invention;

FIG. 3 is a perspective view of a support rail, a bracket and storage devices having features of the present invention;

FIG. 4 is an exploded view of the support rail, the bracket and storage devices of FIG. 3;

FIG. 5A is a perspective view of a plurality of fastener units having features of the present invention;

FIG. 5B is a perspective view of one of the fastener units of FIG. 5A in a latched position;

FIG. 5C is a perspective view of one of the fastener units of FIG. 5A in an unlatched position;

FIG. 6A is a perspective view of a bracket and a portion of two fasteners having features of the present invention;

FIG. 6B is a perspective view of the bracket of FIG. 6A rotated approximately 90 degrees;

FIG. 7A is a cross-sectional view of a support rail, a portion of a bracket, and a fastener unit with a fastener in a latched position and a release handle in a closed position; and FIG. 7B is a cross-sectional view of the support rail, the portion of the bracket, and the fastener unit with the fastener in an unlatched position and the release handle in an open position.

DESCRIPTION

Referring initially to FIG. 1A, the storage system 10 includes a housing 12, at least one support rail 14, a plurality of brackets 16, a fluid source 18, a power source 20, a controller 22, a plurality of storage devices 24, and a fastening system 26. The storage system 10 illustrated in FIG. 1A is sized and shaped to be mounted in a standard 19 inch rack enclosure (not shown). Alternately, the storage system 10 could be designed for other sized rack enclosures or for a standalone table-top configuration.

The housing 12 supports the components of the storage system 10. In FIG. 1A, the housing 12 is generally rectangular frame shaped and encircles the components of the storage system 10. The housing 12 can be made of metal or another suitable rigid structure. The housing 12 can include (i) a front housing cover 28 having an LCD operator control panel 30, a left vent 32, and a spaced apart right vent 34, (ii) a rear housing side 36, (iii) a left housing side 38, (iv) a right housing side 40, and (v) a passive mid-wall 42 that extends transversely between the right housing side 38 and the left housing side 40. The mid-wall 42 separates the fluid source 18, the power source 20, and the controller 22 from the storage devices 24.

The front housing cover 28 is located at a front housing side that is farthest away from the fluid source 18, the power source 20 and the controller 22. The front housing cover 28 is adapted to fit securely around the front housing side and to cover the front housing side. The front housing cover 28 further secures the support rail(s) 14, the brackets 16 and the storage devices 24 within the storage system 10.

The support rail(s) 14 is coupled to the housing 12 and secures the brackets 16 within the housing 12. FIG. 1B illustrates a front plan view of the storage system 10 with the front housing cover 28 removed. As shown in FIG. 1B, the storage system 10 includes two support rails 14 and each support rail 14 has an attachment side 44, a channel side 46, a top portion 48 and a bottom portion 50. The brackets 16 can be secured to the support rail(s) 14 along the attachment side 44. Alternatively, the brackets 16 can be secured to the housing 12.

It should be noted that the combination of the housing 12 and the support rail(s) 14 is collectively referred to herein as a housing assembly 52.

FIG. 1B illustrates that one of the support rails 14 cooperates with the left housing side 38 to define a left rail channel 54 and the other support rail 14 cooperates with the right housing side 40 to define a right rail channel 56. The rail channels 54, 56 are used for cooling the storage devices 24. More specifically, referring to FIGS. 1A and 1B, heat from the storage devices 24 is transferred to the brackets 16 and subsequently to the support rails 14 via conduction. Subsequently, fluid from the fluid source 18 is directed through the rail channels 54, 56 to cool the support rails 14 via convection. In this embodiment, because conduction is used to transfer heat from the storage devices 14, the space between the storage devices 14 can be minimized. As a result thereof, more storage devices 24 can be positioned in a given area and the storage system 10 can store a relatively large amount of data.

As shown in FIG. 1A, each support rail 14 can be designed to receive five brackets 16. Alternately, each support rail 14 could be designed to receive more than five or less than five brackets 16 depending upon the particular requirements of the storage system 10. In FIG. 1A, the brackets 16 are mounted on the support rails 14 with a minimal amount of horizontal spacing between the individual brackets 16. This helps to enable more data to be stored in a smaller physical space. The horizontal distance between the brackets 16 in the present invention is less than approximately 0.375 inches, and the horizontal distance between the brackets is greater than approximately 0.01 inches. However, other distances can be utilized. In the embodiment illustrated in the Figures, the distance is approximately 0.05 inches. It should be noted that the storage system 10 could be designed with less than two or more than two support rails 14.

As illustrated in FIG. 1B, each support rail 14 can include one or more fins 58 that cantilever into the respective channel 54, 56. The fins 58 enhance heat transfer from the support rails 14 because the surface area of the support rails 14 that is exposed to the fluid flowing through the channels 54, 56 is increased.

Secured to a front end of each support rail 14 can be a rail handle 60 that facilitates the removal of the support rail 14 and any attached brackets 16 and storage devices 24 from the housing 12. As shown in FIG. 1B, the rail handle 60 is substantially C-shaped and is secured to the support rail 14 near the top portion 48 and the bottom portion 50 adjacent to the channel side 46. The rail handle 60 is designed to rotate between a closed position and an open position. When in the closed position, as shown in FIG. 1B, the rail handle 60 extends substantially perpendicularly away from the channel side 46 of the support rail 14. The rail handle 60 is designed to pivot outward away from the rail channel 54, 56 approximately 90 degrees through the front housing side (i.e. the open side) and can be held in this open position (not shown). By pulling on the rail handle 60 while it is in the open position, the support rail 14 and any attached brackets 16 and storage devices 24 can be easily removed from the housing 12. When not in use, the rail handle 60 is biased to return to the closed position.

The brackets 16 secure the storage devices 24 to the housing assembly 52. Each of the storage devices 24 fits within one of the brackets 16 that may be present within the storage system 10. Each of the brackets 16 is designed to hold a plurality of storage devices 24. The brackets 16 with the storage devices 24 can, in turn, be secured to one of the support rails 14, thereby effectively securing the storage devices 24 to the support rail 14. In the embodiment illustrated in FIG. 1A, five brackets 16 are used to secure fifteen storage devices 24 to the first support rail 14 and five brackets 16 are used to secure fifteen storage devices 24 to the second support rail 14. Thus, three storage devices 24 can be secured to the support rails 14 within each of the brackets 16. Alternately, each bracket 16 could be designed to hold more than three or less than three storage devices 24. Additionally, the storage system 10 could be designed with more than ten or less than ten brackets 16.

The brackets 16 and the support rails 14 are made of a rigid material. The brackets 16 and support rails 14 can be made of a material having a relatively high coefficient of thermal conductivity to enhance the conduction cooling of the storage devices 24. For example, the brackets 16 and the support rails 14 can be made from a copper alloy such as copper alloy 110 or an aluminum alloy. Alternatively, other materials with similarly high thermal conductivities may be utilized. With this design, the brackets 16 and the support rails 14 enable much of the heat generated from the operation of the storage devices 24 to be transferred away from the storage devices 24 and toward the support rails 14.

A thermal gasket (not shown) can be used (i) at the mounting interface of the storage devices 24 and the respective brackets 16, and (ii) at the mounting interface of the brackets 16 and the support rails 14 to enhance conduction.

The fluid source 18 provides a fluid that is moved through the storage system 10 to remove heat away from the storage system 10. In FIG. 1A, the fluid source 18 includes dual redundant fans that pull the fluid, e.g. air, primarily through the rail channels 54, 56 to cool the storage devices 24. Alternately, for example, the fluid could be blown through the rail channels 54, 56. Still alternately, a single fan could be used to cool the storage system 10.

It should be noted, in the embodiment illustrated in FIG. 1A, the fluid source 18 also pulls a relatively small amount of fluid from around the storage devices 24 to provide a small amount of convection cooling of the storage devices 24. In another embodiment, the storage system 10 could be designed to primarily utilize convection cooling of the storage devices 24.

The power source 20 supplies direct current to the storage system 10 and the storage devices 24 to operate and control the storage devices 24 when they are accessed from a remote computer system (not shown). The power source 20, as shown in FIG. 1A, can be mounted adjacent to the rear housing side 36 and the right housing side 40. Alternately, two power sources can be utilized to provide redundancy. With this design, the storage system 10 will still be able to operate in the event that one of the power sources fails.

In FIG. 1A, each of the storage devices 24 is a disk drive. Each of the storage devices 24 can be controlled by the controller 22 to alternately be in a power-off mode, a standby mode, an idle mode, and a write/read mode. The controller 22, as in FIG. 1A, can be mounted near the right housing side 40, adjacent to the power source 20. In the power-off mode, no power is supplied to the storage devices 24. In the standby mode, power is supplied to the storage devices 24 but the storage disks are not spinning. In the idle mode, power is supplied to the storage devices 24 and the storage disks are spinning, but there is no write or read activity. In the write/read mode, power is supplied to the storage devices 24, the storage disks are spinning, and there is write or read activity. The power consumed by the storage devices 24, and therefore the heat generated from the storage devices 24, increase as you progress through each of the four modes.

The storage system 10 illustrated in FIG. 1A contains the plurality of storage devices 24 for storing data. The remote computer system can be designed to access the storage system 10 to read and write data that is contained on the storage devices 24. When the storage devices 24 are operating they will generate heat and that heat must be removed from the storage devices 24 so that they may continue to operate effectively and efficiently.

In one embodiment, the remote computer system only accesses a limited number of storage devices 24 at any one time. In FIG. 1A, the fluid source 18 is designed to adequately cool the storage system 10 with ten storage devices 24 in the write/read mode and twenty storage devices 24 in the standby mode during the transfer of data. Alternately, more than ten or less than ten storage devices 24 may be in the write/read mode at any one time. As the number of storage devices 24 operating varies, the amount of fluid from the fluid source 18 and the flow rate of the fluid can be varied to achieve the required cooling within the storage system 10.

The number of storage devices 24 utilized in the storage system 10 can be varied to suit the storage requirements of the storage system 10. For example, in FIG. 1A, the storage system 10 includes thirty storage devices 24 (the top ten storage devices 24 can be seen in FIG. 1A, and the six front storage devices 24 can be seen in FIG. 1B). Alternately, for example, the storage system 10 could be designed with more than thirty or less than thirty storage devices 24. For example, the storage system 10 could be designed with only fifteen storage devices 24.

FIG. 2 illustrates the storage system 10 after the first support rail 14 with attached brackets 16 and storage devices 24 has been removed from the housing 12 through the front housing side, while the second support rail 14 with attached brackets 16 and storage devices 24 remains in the housing 12. The housing 12 is closed on the other three sides to substantially enclose all of the other elements of the storage system 10. The front housing side is open to enable the support rails 14 with attached brackets 16 and storage devices 24 to easily be removed from the housing 12 by using the rail handle 60 as noted above. While the support rail 14 with attached brackets 16 and storage devices 24 is outside the housing 12, as shown in FIG. 2, the storage devices 24 and brackets 16 can be easily removed from the support rail 14 for testing, repair and/or replacement. After any storage devices 24 have been necessarily tested, repaired and/or replaced, the support rail 14 with attached brackets 16 and storage devices 24 can easily be slid back into place inside the housing 12.

As shown in the drawings, the housing 12 can be sized to receive two support rails 14 with attached brackets 16 and storage devices 24. By designing the housing 12 to receive two support rails 14 with attached brackets 16 and storage devices 24, the storage system 10 can store substantially more data than a comparable system that houses only one support rail 14 with attached brackets 16 and storage devices 24. The size of the housing 12 can be altered to accommodate more than two or less than two support rails 14 with attached brackets 16 and storage devices 24 as required by the individual storage system 10.

Each support rail 14 includes a rail connector 200 that electrically connects to a mid-wall connector 202 on the mid-wall 42. When the support rail 14 is within the housing 12, the connectors 200, 202 cooperate to electrically connect the controller 22 to the storage devices 24 attached to the specific support rails 14. For example, one of the connectors 200, 202 can include one or more electrical pins and the other connector 202, 200 can include one or more pin receivers. The connectors 200, 202 allow the support rails 14 to be easily removed and added to the housing 12.

FIG. 3 illustrates one bracket 16 securing three storage devices 24 to the support rail 14. The actual number of storage devices 24 within each bracket 16 can be altered to suit the requirements of the particular storage system 10. The size of the brackets 16 can also be altered to receive more than three or less than three storage devices 24 depending on the requirements of the particular storage system 10. Within each bracket 16, the storage devices 24 are stacked vertically on top of each other. Each storage device 24 has a pair of planar surfaces, including a top surface 300 and a bottom surface 302. The storage devices 24 are secured within the bracket 16 so that the top surface 300 of one storage device 24 is directly beneath the bottom surface 302 of another storage device 24. In one embodiment, the storage devices 24 are placed in this position so that the distance between the surfaces 300, 302 is greater than approximately 0.01 inches. Additionally, the storage devices 24 are positioned so that the distance between the surfaces 300, 302 is less than approximately 0.375 inches. In the embodiment illustrated in the Figures, the distance is approximately 0.05 inches. However, other distances can be utilized. This limited separation between the storage devices 24 is substantially smaller than the separation for most existing storage systems. This enables a greater amount of data to be stored in a much smaller physical environment.

FIG. 3 also illustrates that drive fasteners 304, e.g. threaded bolts, extend through the bracket 16 to secure the storage devices 24 to the bracket 16. Alternately, other types of fasteners can be utilized.

FIG. 4 illustrates a perspective view of the support rail 14, one bracket 16 and three storage devices 24. In FIG. 4, the bracket 16 is substantially U-shaped, and receives three storage devices 24 securely within the bracket 16. Each bracket 16 has a proximal end 400 and two extension arms 402 that extend substantially perpendicularly away from the proximal end 400. The proximal end 400 of each bracket 16 is positioned to face the attachment side 44 of the support rail 14. The proximal end 400 of each bracket 16 then is secured to the attachment side 44 of the support rail 14.

In FIG. 4, each side (only one side is shown) of each storage device 24 includes three internally threaded drive apertures 404, and each of the extension arms 402 of each bracket 16 includes three bracket apertures 406 for each storage device 24. With this design, the drive fasteners 304 (only one is illustrated in FIG. 4) can be used to secure the storage devices 24 to the brackets 16.

A circuit board 408 having a plurality of electrical connectors 410 can be situated adjacent to an interior wall of the proximal end 400 of the bracket 16. The electrical connectors 410 provide an electrical connection between the storage devices 24 and the bracket 16. The electrical connectors 410 are adapted to connect to corresponding storage device connectors 411 situated along a rear of the storage devices 24. For example, one of the connectors 410, 411 can include one or more electrical pins and the other connector 411, 410 can include one or more pin receivers. The connectors 410, 411 allow the storage devices 24 to be easily removed and added to the bracket 26.

Along a lower edge of the attachment side 44, the support rail 14 includes a support rail connector 420 that is electrically connected to rail connector 200 (illustrated in FIG. 2) and the controller 22 (illustrated in FIG. 2) via the mid-wall connector 202 (illustrated in FIG. 2). Each support rail connector 420 has a horizontal portion 422 and a vertical portion 424. The horizontal portion 422 is secured to the attachment side 44 of the support rail 14 and extends substantially perpendicularly away from the attachment side 44. The vertical portion 424 extends up vertically near an end of the horizontal portion 422 farthest away from the attachment side 44 of the support rail 14. Each support rail connector 420 is adapted to electrically connect to a bracket connector (not shown) on the circuit board 408 to electrically connect the circuit board 408 and the storage devices 24 to the controller 22 (illustrated in FIG. 2) via the electrical connectors 410 and the storage device connectors 411. For example, one support rail connector 420 can include one or more electrical pins and the other connector can include one or more pin receivers. The support rail connectors 420 allow the bracket 16 to be slid downward to electrically connect the circuit board 408 to the controller 22 or slid upward to electrically disconnect the circuit board 408 from the controller 22. With this design, the circuit board 408 can be electrically connected at approximately the same time the bracket 16 is mechanically attached to the support rail 14.

FIG. 4 illustrates a portion of the fastening system 26 including ten fastener units 450. The fastener units 450 extend through and are secured to a portion of the housing assembly 52. As shown in FIG. 4, the plurality of fastener units 450 can extend through the support rail 14. Alternately, the plurality of fastener units 450 can be positioned to extend through a side of the housing (not shown in FIG. 4).

As shown in FIG. 4, the support rail 14 can be designed to accommodate two fastener units 450 for each bracket 16 that is secured to the support rail 14. The fastener units 450 are positioned so that two fastener units 450 secure the bracket 16 along the proximal end 400 near each extension arm 402 of the bracket 16. Alternately, the actual number of fastener units 450 for each bracket 16 and the location of the fastener units 450 for each bracket 16 can be varied to suit the particular needs of the individual storage system 10.

In FIG. 4, the support rail 14 includes ten fastener units 450 for securing five brackets 16 (only one is shown) to the support rail 14. Because the storage system 10 can have two support rails, there can be twenty fastener units 450 within the storage system 10. Alternately, the storage system 10 can be designed with more than twenty or less than twenty fastener units 450.

The design of the fastener units 450 and the components in the fastener units 450 can be varied. In FIG. 4, each fastener unit 450 includes a first fastener assembly 452, a second fastener assembly 454, and a release assembly 456. Alternately, each fastener unit 450 can be designed to include only one fastener assembly.

FIG. 5A illustrates a perspective view of the fastening system 26 including a plurality of fastener units 450 without the support rail (not shown in FIG. 5A). FIG. 5B is an enlarged perspective view of one of the fastener units 450 from FIG. 5A in a latched position 500 and FIG. 5C is an enlarged perspective view of one of the fastener units 450 from FIG. 5A in an unlatched position 502. In this embodiment, the fastener unit 450 includes the first fastener assembly 452, the second fastener assembly 454 spaced apart from the first fastener assembly 452, and the release assembly 456. Further, the fasteners assemblies 452, 454 are aligned vertically with the first fastener assembly 452 spaced apart and positioned above the second fastener assembly 454.

Each fastener assembly 452, 454 includes a fastener 506, a stop 508, and a resilient member 510. In this embodiment, the fastener 506 is shaped somewhat similar to a shoulder screw and includes a head portion 512 and a shaft portion 514. The head portion 512 has a larger diameter than the shaft portion 514 of each fastener 506.

The stop 508 is secured to a distal end of the fastener 506 and retains the fastener 506 within the support rail 14 (illustrated in FIG. 4) with the resilient member 510 positioned between the stop 508 and the support rail 14. In this embodiment, the stop 508 is somewhat annular shaped and fits onto the distal end of the shaft portion 514 of the fastener 506. The stop 508 can be maintained on the shaft portion 514 in a number of ways. For example, the stop 508 can be press fitted onto the shaft portion 514, threaded onto the shaft portion 514, or adhered with an adhesive to the shaft portion 514. In this embodiment, the stop 508 includes a flat side 516 and a beveled edge 518 that faces the release assembly 456. The release assembly 456 interacts with the flat side 516 and the beveled edge 518 as detailed below to move each fastener assembly 452, 454 between the latched position 500 and the unlatched position 502.

Additionally, an outer perimeter of the stop 508 includes a notch 520 that receives a projection (not shown) from the support rail 14. With this design, the projection can inhibit the stop 508 and the fastener assembly 452, 454 from rotating while allowing the fastener assembly 452, 454 to slide relative to the support rail 14.

The resilient member 510 moves the fastener 506 from the unlatched position 502 to the latched position 500 and maintains the fastener 506 in the latched position 500. In this embodiment, the resilient member 510 surrounds the shaft portion 514 of the fastener 506. Further, in this embodiment, each resilient member 510 is a coil spring. Alternately, for example, each resilient member can be a piece of elastic material, such as a rubber grommet. It should be noted that when the fastener 506 is in the unlatched position 502, the resilient member 510 is more compressed than when the fastener 506 is in the latched position 500.

The release assembly 456 is used to concurrently move the fastener assemblies 452, 454 between the latched position 500 and the unlatched position 502. Each release assembly 456 includes a release shaft 522, a release handle 524 and a release connector 526.

The release shaft 522 is coupled to and is used to concurrently move two of the fastener assemblies 452, 454 between the latched position 500 and the unlatched position 502. In this embodiment, the release shaft 522 is shaped similar to a round pin and includes a shaft top 528, a shaft bottom 530, a first groove 532 and a spaced apart second groove 534. The release shaft 522 has a substantially circular cross-section, and each groove 532, 534 can be cut into the circular cross-section at an angle of approximately 60 degrees relative to a longitudinal axis 536 of the release shaft 522. Alternately, the grooves 532, 534 can be cut into the release shaft 522 at greater than 60 or less than 60 degrees relative to the longitudinal axis 536 of the release shaft 522. Each groove 532, 534 is large enough to receive the beveled edge 518 of the stop 508.

The space between the first groove 532 and the second groove 534 is approximately equal to the space between the first fastener assembly 452 and the second fastener assembly 454. As illustrated in FIG. 5B, with this design, when the release handle 524 is in a closed position 540, the stop 508 for the first fastener assembly 452 is in the first groove 532 and the stop 508 of the second fastener assembly 454 is in the second groove 534. This allows the resilient member 510 of the first fastener assembly 452 to move the first fastener assembly 452 to the latched position 500 and the resilient member 510 of the second fastener assembly 454 to move the second fastener assembly 454 to the latched position 500.

In this embodiment, the release shaft 522 is positioned substantially perpendicular to the fastener assemblies 452, 454. In this design, the release handle 524 moves the release shaft 522 upward relative to the fastener assemblies 452, 454. For each fastener assembly 452, 454, this causes a wall of the respective groove 532, 534 of the release shaft 522 to engage the beveled edge 518 of the stop 508, overcome the bias from the resilient member 510, and move the stop 508 and the fastener 506 to the unlatched position 502. FIG. 5C illustrates that with the release handle 524 in an open position 542, the stops 508 have been moved at least partly from the grooves 532, 534, the resilient members 510 are more compressed, and the fasteners 506 are moved radially outward into the unlatched position 502.

Alternately, for example, the fastener unit 450 could be designed so that the release handle 524 moves the release shaft 522 downward or sideways to move the fasteners 506 to the unlatched position 502. Still alternately, separate release assemblies 456 could be used for each of the fastener assemblies 452, 454.

In the illustrated embodiment, to move the fasteners 506 to the latched position 500, the release handle 524 is rotated to the closed position 540. During this time, the resilient members 510 urge the stops 508 against the wall of the grooves 532, 534 to urge the release shaft 522 downward. This allows the stops 508 to enter the grooves 532, 534 and the fasteners 506 to move radially inward to the latched position 500.

The release handle 524 moves the release shaft 522 and causes the release shaft 522 to move the fastener assemblies 452, 454. The release handle 522 is moved between the closed position 540 illustrated in FIG. 5B and the open position 542 illustrated in FIG. 5C. In the closed position 540, the release shaft 522 is positioned so that the stops 508 are within the respective grooves 532, 534. This allows the resilient members 510 to move and retain the fasteners 506 in the latched position 500. Alternately in the open position 542, the release shaft 522 is moved upward and the wall of each groove 532, 534 of the release shaft 522 engages the stops 508 and urges the fasteners 506 to the unlatched position 502.

In this embodiment, in the closed position 540, the release handle 524 is substantially perpendicular to the release shaft 522. Alternately, the release handle 524 can be rotated about the release connector 526 relative to the release shaft 522 to the open position 542. In the open position 542, the release handle 524 is substantially parallel and in line with the release shaft 522.

The release handle 524 includes a proximal end 544 and a distal end 546. The proximal end 544 includes two arms that extend around the shaft top 528 of the release shaft 522. Each of the arms of the release handle 524 has a small handle aperture 548 to correspond with a shaft aperture (not shown) near the shaft top 528 of the release shaft 522. The proximal end 544 of the release handle 524 includes a cam region 550 that extends past the handle apertures 548. As discussed below, during rotation of the release handle 524 towards the open position 542, the cam region 550 engages the top portion 48 of support rail 14. This causes the release handle 524 and the release shaft 522 to move upward relative to the support rail 14 and the fastener assemblies 452, 454.

Alternately, the release handle 524 could be another type of device that moves the release shaft 522. For example, the release handle could be an internally threaded nut that engages an externally threaded surface on the release shaft or an actuator.

The release connector 526 allows the release handle 524 to move and rotate relative to the release shaft 522. In the embodiment illustrated in FIGS. 5B and 5C, the release connector 526 is a hollow pin that extends through the proximal end 544 of the release handle 524 and the shaft top 528 of the release shaft 522. Alternately, for example, the release connector 526 can be any fastener that can create a pivot point between the handle and shaft.

In this embodiment, the release handle 524 can rotate approximately ninety degrees around the release connector 526 between the closed position 540 and the open position 542. Alternately, the release handle 524 can be designed to rotate more than ninety degrees or less than ninety degrees around the release connector 526.

FIGS. 6A and 6B illustrate alternate perspective views of one embodiment of the bracket 16. FIG. 6A also illustrates a pair of the fasteners 506. In this embodiment, each extension arm 402 includes a device support 600 that helps vertically support the storage devices (not shown in FIGS. 6A and 6B) when they are secured within the bracket 16. The storage device supports 600 are located along a bottom edge of each of the extension arms 402 of the bracket 16 near a distal end of the bracket 16.

Additionally, each bracket 16 includes a series of attachment apertures 602 that are positioned and extend through the proximal end 400 of the bracket 16. Each attachment aperture 602 receives one of the fasteners 506. To correspond to the fasteners 506, the bracket 16 includes two upper attachment apertures 604 and two lower attachment apertures 606. Each of the lower attachment apertures 606 has a rounded portion 608 and a slot portion 610. Each of the upper attachment apertures 604 has a circular portion 612 and a slot portion 614. Situated along a top portion of each upper attachment aperture 602 is the slot portion 614 that extends upward from the circular portion 612. For the lower attachment apertures 606, the slot portion 610 extends upward from the rounded portion 608.

The fasteners 506 and the attachment apertures 602 are sized, shaped and spaced so that the head portion 512 and the shaft portion 514 of each fastener 506 fits fully though the circular portion 612 or the rounded portion 608 of the corresponding attachment aperture 602. Only the shaft portion 514 of each fastener 506, and not the head portion 512, is adapted to fit through the slot portion 610, 614 of the corresponding attachment aperture 602. In the unlatched position, the head portion 512 and the shaft portion 514 of the fastener 506 can fit through the circular portion 612 or rounded portion 608 of the corresponding attachment aperture 602. The bracket 16 can then be moved downward so that the shaft portion 514 of the fastener 506 fits into the slot portion 610, 614 of the corresponding attachment aperture 602. With the shaft portion 514 of the fastener 506 in the slot portion 610, 614 of the attachment aperture 602, the fasteners 506 are then moved to the latched position 500 to securely fasten the bracket 16 to attachment side 44 of the support rail 14.

In order to remove the bracket 16 from the fasteners 506, the fasteners 506 must be moved to the unlatched position 502. In the unlatched position 502, the bracket 16 may be lifted so that the head portion 512 of the fasteners 506 can once again easily fit through the circular portion 612 or rounded portion 608 of the corresponding attachment aperture 602. With the bracket 16 removed from the fasteners 506, the bracket 16 is no longer secured to the attachment side 44 of the support rail 14.

Alternately, the attachment apertures 602 could be sized and shaped so that the bracket 16 is slid sideways or downward to remove the bracket 16.

FIG. 7A is a cross-sectional view of the support rail 14, a portion of the bracket 16, and the fastener unit 450 with the fastener assemblies 452, 454 in the latched position 500 and the release handle 524 in the closed position 540. FIG. 7A illustrates that the shaft portion 514 of each fastener 506 fits through a rail aperture 700 in the support rail 14 and that the resilient member 510 is positioned between the stop 508 and the support rail 14. With this design, the fastener 506 can slide relative to the support rail 14. FIG. 7A also illustrates that the release shaft 522 fits through an upper shaft aperture 702 in the top portion 48 of the support rail 14 and a lower shaft aperture 704 in the bottom portion 50 of the support rail 14. With this design, the release shaft 522 can slide up and down relative to the support rail 14 and the fastener assemblies 452, 454. FIG. 7A also illustrates that the release handle 524 is positioned on the opposite side of the top portion 48 of the support rail 14.

It should be noted that when the fastener assemblies 452, 454 are in the latched position 500, the grooves 532, 534 of the release shaft 522 are positioned adjacent to the stop 508 of each fastener 506, and the resilient member 510 urges the stop 508 into the groove 532, 534 and the head portion 512 of the fastener 506 pulls the bracket 16 snugly against the attachment side 44 of the support rail 14 to secure the bracket 16 to the support rail 14.

FIG. 7B is a cross-sectional view of the support rail 14, a portion of the bracket 16, and the fastener unit 450 with the fastener assemblies 452, 454 in the unlatched position 502 and the release handle 524 in the open position 542. FIG. 7B illustrates that the rotation of the release handle 524 about the release connector 526 causes the cam region 550 to engage the top portion 48 of the support rail 14 and move the cam release shaft 522 upwardly relative to the support rail 14 and the fastener assemblies 452, 454. FIG. 7B also illustrates that the upward movement of the release shaft 522 causes the release shaft 522 to displace the stops 508 at least partly from the grooves 532, 534. For each fastener assembly 452, 454, this causes the fastener 506 to move radially and the resilient member 510 to compress.

It should be noted that when the fastener assemblies 452, 454 are in the unlatched position 502, the stops 508 are no longer positioned completely in the grooves 532, 534 of the release shaft 522, the bias of the resilient member 510 is overcome, and the head portion 512 of the fastener 506 is spaced apart and positioned away from the bracket 16. In this position, the bracket 16 can be slid upward and removed from the fastener assemblies 452, 454.

While the designs provided herein are fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A storage system comprising:
   a plurality of storage devices;
   a housing assembly including a housing;
   a first fastener assembly including a first fastener that is movable between a latched position and an unlatched position, the first fastener assembly extending through at least a part of the housing assembly to secure the plurality of storage devices to the housing assembly; and
   a bracket including a first attachment aperture that receives the first fastener to secure the bracket to the housing assembly, wherein the bracket receives the plurality of storage devices and to secure the plurality of storage devices to the housing assembly.

2. The storage system of claim 1 wherein the housing assembly further includes a first support rail coupled to the housing.

3. The storage system of claim 1 wherein the first fastener includes a shaft portion and a head portion, wherein the cross-section of the head portion is greater than the cross-section of the shaft portion.

4. The storage system of claim 1 further comprising a first release assembly including a first release shaft adapted to move the first fastener between the latched position and the unlatched position.

5. The storage system of claim 1 wherein the plurality of storage devices are situated so that a top surface of one storage device is directly beneath a bottom surface of another storage device, wherein the distance between the surfaces is less than approximately 0.375 inches.

6. The storage system of claim 1 further comprising a second fastener assembly including a second fastener that is movable between a latched position and an unlatched position, the second fastener extending through at least a part of the housing assembly to secure the plurality of storage devices to the housing assembly.

7. The storage system of claim 1 further comprising a plurality of brackets that are adapted to secure the plurality of storage devices to the housing assembly, wherein the plurality of brackets are positioned side-by-side along the housing assembly, wherein the distance between each of the brackets is less than approximately 0.375 inches.

8. The storage system of claim 3 wherein the first attachment aperture includes a rounded portion and a slot portion.

9. The storage system of claim 3 wherein the first fastener assembly further includes a first fastener stop that inhibits the first fastener from being removed from the housing assembly.

10. The storage system of claim 3 wherein the first fastener assembly further includes a first resilient member that substantially surrounds at least a part of the shaft portion of the first fastener, wherein the first resilient member is biased to move the first fastener from the unlatched position to the latched position.

11. The storage system of claim 4 wherein the first release shaft has a first groove positioned adjacent to the first fastener assembly.

12. The storage system of claim 4 wherein the first release assembly further includes a first release handle coupled to the first release shaft, wherein the first release handle is movable between a closed position and an open position, wherein the first fastener is in the latched position when the first release handle is in the closed position and wherein the first fastener is in the unlatched position when the first release handle is in the open position.

13. The storage system of claim 6 further comprising a first release assembly including a first release shaft having a first groove positioned adjacent to the first fastener assembly and a second groove positioned adjacent to the second fastener assembly.

14. The storage system of claim 6 wherein the bracket further includes a second attachment aperture that receives the second fastener, the second attachment aperture having a rounded portion and a slot portion.

15. The storage system of claim 6 further comprising a third fastener assembly including a third fastener, and a fourth fastener assembly including a fourth fastener, wherein the third fastener and the fourth fastener are movable between a latched position and an unlatched position, the third fastener and the fourth fastener extends through at least a part of the housing assembly to secure the plurality of storage devices to the housing assembly.

16. The storage system of claim 8 wherein the head portion of the first fastener is adapted to fit through the rounded portion of the first attachment aperture and wherein the head portion of the first fastener does not fit through the slot portion of the first attachment aperture.

17. The storage system of claim 8 wherein the slot portion of the first attachment aperture extends upward from a top of the rounded portion of the first attachment aperture.

18. The storage system of claim 15 further comprising a second release assembly including a second release shaft adapted to move the third fastener and the fourth fastener between the latched position and the unlatched position, wherein the second release shaft has a first groove positioned adjacent to the third fastener assembly and a second groove positioned adjacent to the fourth fastener assembly.

19. The storage system of claim 15 wherein the bracket further includes a third attachment aperture that is adapted to receive the third fastener and a fourth attachment aperture that is adapted to receive the fourth fastener.

20. The storage system of claim 16 wherein the shaft portion of the first fastener is adapted to fit through the slot portion of the first attachment aperture.

21. The storage system of claim 18 wherein the second release assembly further includes a second release handle coupled to the second release shaft, the second release handle movable between a closed position and an open position, wherein the second release handle is adapted to move the third fastener and the fourth fastener between the latched position and the unlatched position, wherein the third fastener and the fourth fastener are in the latched position when the second release handle is in the closed position and wherein the third fastener and the fourth fastener are in the unlatched position when the second release handle is in the open position.

* * * * *